United States Patent Office 2,942,003
Patented June 21, 1960

2,942,003

PROCESS FOR PREPARING NAPHTHO [1,2-d]-THIAZOLES

Ralph A. Copeland, Chenango Bridge, N.Y., assignor to General Aniline & Film Corporation, New York, N.Y., a corporation of Delaware No Drawing. Filed June 6, 1957, Ser. No. 663,903

3 Claims. (Cl. 260—304)

This invention relates to a process for the preparation of 2-alkylnaphtho[1,2-d]thiazoles.

It is known to prepare 2-alkylnaphtho[1,2-d]thiazoles by the oxidative ring closure of a N-1-naphthyl aliphatic thioamide. This method however often results in low yields. Further, the manufacture of the parent thioamides requires the use of phosphorous pentasulfide which is particularly undesirable and obnoxious in operations on a large scale.

It is therefore the purpose and object of the present invention to provide a new and improved method of producing 2-alkylnaphtho[1,2-d]thiazoles which avoids the disadvantages inherent in the older procedures of the prior art.

The method as herein described comprises reacting an α-halo-3,4-dihydro-1-(2H)naphthalenone of the following general formula:

(I)

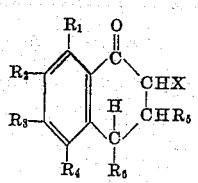

wherein $R_1$, $R_2$, $R_3$ and $R_4$ are hydrogen, an alkyl group, i.e., methyl, ethyl, n-propyl, isobutyl, n-butyl, n-amyl, n-hexyl, etc.; an aromatic radical of the benzene or naphthalene series, i.e., phenyl, halophenyl, e.g., chlorophenyl, dichlorophenyl, naphthyl, etc.; a halogen group, i.e., bromine or chlorine, an alkoxy group, i.e., methoxy, ethoxy, n-propoxy, n-butoxy, etc.; a nitro group, etc.; X is halogen, i.e., chlorine or bromine, and $R_5$ and $R_6$ are hydrogen or alkyl groups as above with an aliphatic thioamide of the general formula:

(II) 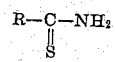

wherein R stands for an alkyl group, i.e., methyl, ethyl, n-butyl, etc.; aralkyl, i.e., benzyl, phenethyl, etc.; alkoxyalkyl, i.e., methoxymethyl, ethoxymethyl, n - propoxymethyl, alkylmercaptoalkyl, i.e., methylmercaptomethyl, methylmercaptoethyl, methylmercapto n - propyl, etc.; arylmercaptoalkyl, i.e., phenylmercaptomethyl, phenylmercaptoethyl, phenylmercapto n-propyl, α- or β-naphthylmercaptomethyl, etc.; aroxylalkyl, i.e., phenoxymethyl, phenoxyethyl, phenoxy n-propyl, etc.; α- or β-naphthoxymethyl, etc.

The initial product of the aforementioned reaction does not yield the fully aromatic 2-alkylnaphtho[1,2-d]thiazole directly but instead produces an intermediate dihydro form of the above azole having the following formula:

(III)

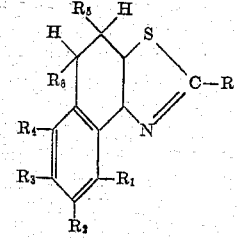

wherein R, $R_1$, $R_2$, $R_3$, $R_4$, $R_5$ and $R_6$ have the values given above.

The aforesaid 2 - alkyl - 4,5 - dihydronaphtho[1,2]thiazole is then treated with a dehydrogenating agent of the type commonly used to effect aromatization such as sulfur, selenium, finely divided platinum, palladium, nickel, bromine, and the like. The resulting 2-alkylnaphtho[1,2-d]thiazole thus produced is represented by the following general formula:

(IV)

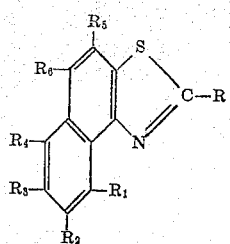

wherein R, $R_1$, $R_2$, $R_3$, $R_4$, $R_5$ and $R_6$ have the values assigned above.

As examples of α-halo-3,4-dihydro-1-(2H)naphthalenones that can be used in this process, the following list is representative:

2-bromo-3,4-dihydro-1-(2H)naphthalenone
2-bromo-2,7-diethyl-3,4-dihydro-1-(2H)naphthalenone
2-bromo-3,4-dihydro-6,7-dimethyl-1-(2H)naphthalenone
2-bromo-3,4-dihydro-7-methoxy-1-(2H)naphthalenone
2-chloro-3,4-dihydro-7-methoxy-1-(2H)naphthalenone
2-bromo-3,4-dihydro-5,7-dimethyl-1-(2H)naphthalenone
2 - bromo - 3,4 - dihydro - 6,7 - dimethoxy - 3 - methyl - 1-(2H)naphthalenone
2-bromo-3,4-dihydro-4-phenyl-1-(2H)naphthalenone Illustrative of the aliphatic thioamides that can be used are the following:

Thioacetamide            Phenoxythioacetamide
Thiopropionamide         Phenylmercaptothioacetamide
Phenylthioacetamide      Thiovaleramide It is a particular advantage of the present invention that for every 2-alkylnaphtho[1,2-d]thiazole nucleus produced, there is also obtained the corresponding 4,5-dihydro derivative of the fully aromatic base. These partially hydrogenated naptho[1,2-d]thiazoles are valuable heterocyclic bases in themselves which can be used to produce a wide variety of cyanine dyes for sensitizing photographic emulsions.

Usually, I prepare the 2 - alkyl - 4,5 - dihydronaphtho[1,2-d]thiazoles of the present invention by melting the α-halo-3,4-dihydro-1-(2H)naphthalenone with an aliphatic thioamide in the presence of a basic condensing agent such as the alkali metal carbonates. It is generally desirable to employ a solvent such as a lower aliphatic alcohol, i.e., ethyl alcohol, in those instances where the starting materials are fairly high melting solids, as the solvent provides a suitable medium in which the reaction can occur.

The aforesaid dihydronaphtho[1,2-d]thiazoles are conveniently isolated from their reaction mixtures by addition of excess alkali, i.e., alkali metal hydroxides, whereby the azole bases are liberated and may then be isolated by steam distillation or by extraction with ether.

The dihydronaphtho[1,2-d]thiazoles are then dehydrogenated to their fully aromatic form by heating in the presence of a dehydrogenating agent such as sulfur. Both types of bases, that is, the 4,5-dihydronaphtho[1,2-d]thiazoles and their fully aromatized counterparts can be purified by fractionation in vacuo followed by crystallization in the case of the solid bases.

The synthesis of the α-halo-3,4-dihydro-1-(2H)-naphthalenones used as starting material in these series of reactions is patterned after the procedure described in the Journal of the American Chemical Society 68, 87 (1946), for the preparation of 2-bromo-3,4-dihydro-1-(2H)naphthalenone.

The following examples will serve to further illustrate the process and reactions of this invention but it is to be understood that said examples are merely illustrative and do not impose any restrictions on the invention.

EXAMPLE I

*4,5-dihydro-2-methylnaphtho[1,2-d]thiazole*

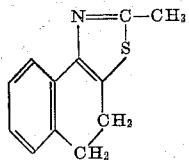

In a 3-liter, 3-necked round bottomed flask, fitted with a paddle stirrer, Dean-Stark trap-bulb condenser system, addition tube and heated by a steam bath, is placed 250 ml. of methanol, 90 g. (1.2 moles) of thioacetamide and 68 g. (0.64 mole) of anhydrous sodium carbonate. The above ether solution of 2-bromo-3,4-dihydro-1-(2H) naphthalenone is run into this stirred, heated slurry at such a rate that the ether is condensed without flooding and removed as collected in the Dean-Stark trap. Heating is continued for 45 minutes by which time no more distillate comes over. The contents of the flask are then a brownish oil with granular $Na_2CO_3$ and a finer white solid (NaBr) suspended therein. To this is added 500 ml. of cold water. The solids dissolve (solution should be basic to alkacid paper) and a heavy brown oil separates on the bottom. The mixture is transferred to a separatory funnel and about 500 ml. of ether is used to extract the oil. The ether layer is washed two times with 250 ml. of 3 N NaOH solution and once with 500 ml. of cold water. It is allowed to drain well and is dried over anhydrous $CaSO_4$. The ether is removed by distillation leaving as residue the crude product. This material may be used directly in the dehydrogenation step or purified as follows:

(a) *Formation of hydrochloride.*—The above ether extract, after washing as described, is treated with a slight excess of 6 N HCl solution. A white precipitate of the hydrochloride forms and is removed by filtering with suction. The solid is triturated with acetone-ether solution and sucked dry. It may be crystallized from hot 6 N hydrochloric acid.

(b) *Free base.*—The hydrochloride salt is suspended in water and sufficient 6 N NaOH added to make the system strongly basic. An oil forms which is extracted by ether and worked up as above. The residual oil is then distilled at reduced pressure; B.P. 162–165° C. at 6.8 mm. Index of refraction 1.6372.

EXAMPLE II

*2-methylnaphtho[1,2-d]thiazole*

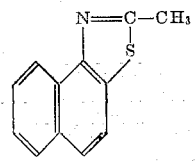

In a 250 ml., 3-necked flask, fitted with an inside 360° C. thermometer, a stirrer, a long, dry condenser, and heated by a Wood's metal bath, is placed 56 g. (0.279 mole) of 4,5-dihydro-2-methylnaphtho[1,2-d]thiazole and 10 g. (0.312 mole, 10% excess) of powdered sulfur. The temperature of the system is then raised. The sulfur completely dissolves and between 150° C. and 200° C. bubbling begins. The temperature is allowed to rise to 250° C.±5° C. and is held there for about 30 minutes. Hydrogen sulfide is evolved in that period and gradually slackens off. The melt is allowed to cool somewhat and then poured into a 1-necked flask and set up for vacuum distillation. The product boils at 165–168° C./5.5 mm. Yield 46 g. (82%). On cooling, the pale yellow oil solidifies to a hard crystalline solid. A sample of this was crystallized from 90–100° C. petroleum ether; M.P. 95–97° C.

Analysis: Calculated for $C_{12}H_9NS$—

|   | Calc'd., percent | Found, percent |
| --- | --- | --- |
| C | 72.30 | 72.16 |
| H | 4.73 | 4.72 |
| S | 16.1 | 16.34 |
| N | 7.04 | 6.86 |

EXAMPLE III

*2,5-dimethyl-4,5-dihydronaphtho[1,2-d]thiazole*

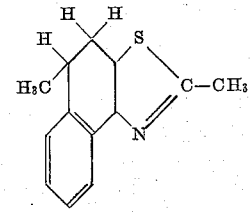

The reaction was carried out as described in Example I while using 2-bromo-3,4-dihydro-4-methyl-1-(2H)naphthalenone in place of 2-bromo-3,4-dihydro-1-(2H)naphthalenone. The resulting product distilled at 167° C. at 4.8 mm. The refractive index of the yellow oil was 1.6245.

EXAMPLE IV

*2,5-dimethylnaphtho[1,2-d]thiazole*

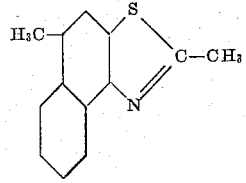

The dehydrogenation was carried out as described in Example II with a 10% excess of sulfur. The product which distilled at 178° C. at 5.3 mm. solidified to a hard yellow crystalline mass. Crystallization from petroleum ether (B.P. 90–100° C.) gave prisms which melted at 70–70.5° C.

I claim:
1. A process of preparing a lower 2-alkylnaphtho-[1,2-d]thiazole which comprises heating a lower alkyl thioamide of the following general formula:

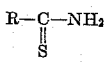

wherein R is a lower alkyl group with an α-halo-3,4-dihydro-1-(2H)naphthalenone of the following general formula:

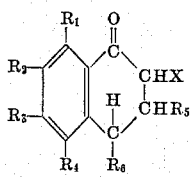

wherein $R_1$, $R_2$, $R_3$, $R_4$, $R_5$ and $R_6$ are selected from the class consisting of hydrogen, lower alkyl and lower alkoxyl groups and X represents a halogen atom in order to produce a lower 2-alkyl-4,5-dihydronaphtho[1,2-d]-thiazole of the following general formula:

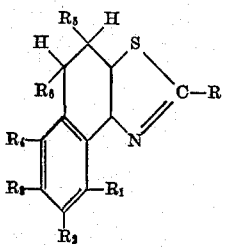

wherein $R_1$, $R_2$, $R_3$, $R_4$, $R_5$ and $R_6$ are elected from the class consisting of hydrogen, lower alkyl and lower alkoxy groups and reacting the thus produced lower 2-alkyl-4,5-dihydronaphtho[1,2-d]thiazole with sulfur to produce a lower 2-alkylnaphtho[1,2-d]thiazole of the following general formula:

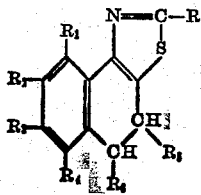

wherein $R_1$, $R_2$, $R_3$, $R_4$, $R_5$ and $R_6$ are selected from the class consisting of hydrogen, lower alkyl groups and lower alkoxy groups.

2. A process of preparing 2-methylnaphtho[1,2-d]-thiazole which comprises heating thioacetamide with 2-bromo-3,4-dihydro-1-(2H)naphthalenone in order to produce 4,5-dihydronaphtho-2-methyl[1,2-d]thiazole and dehydrogenating the thus produced 4,5-dihydro-2-methyl-naphtho[1,2-d]thiazole with sulfur in order to produce 2-methylnaphtho[1,2-d]thiazole.

3. A process of preparing 2,5-dimethylnaphtho[1,2-d]-thiazole which comprises heating thioacetamide with 2-bromo-3,4-dihydro-4-methyl-1-(2H)naphthalenone in order to produce 4,5-dihydronaphtho-2,5-dimethyl[1,2-d]-thiazole and dehydrogenating the thus produced 4,5-dihydro-2,5-dimethyl[1,2-d]thiazole with sulfur in order to produce 2,5-dimethyl[1,2-d]thiazole.

References Cited in the file of this patent

Elderfield: Heterocyclic Compounds (Wiley), vol. 5, pp. 496–497 (1957).
(Citing Hantzsch et al.: Liebig's Ann., vol. 249, pp 1, 31 (1888).)
(Citing Hantzsch et al.: Liebig's Ann., vol. 250, pp. 257, 281 (1889).)
(Citing Hantzsch et al.: Liebig's Ann., vol. 259, pp. 228, 253 (1890).)
Charonnat et al.: Bull. Soc. Chim. France, vol. 1949, pp. 208–211.
Emmert et al.: Chem. Ber., vol. 86, pp. 208–213 (1953).
Emmert et al.: Chem. Ber., vol. 87, pp. 676–81 (1954).
Jennen et al.: Compt. Rend., vol. 241, pp. 1581–3 (1955).
Jennen et al.: Compt. Rend., vol. 242, pp. 786–7 (1956).